United States Patent [19]

Martin

[11] 4,070,094

[45] Jan. 24, 1978

[54] OPTICAL WAVEGUIDE INTERFEROMETER MODULATOR-SWITCH

[75] Inventor: William E. Martin, San Diego, Calif.

[73] Assignee: The United States of America as represented by the Secretary of the Navy, Washington, D.C.

[21] Appl. No.: 607,172

[22] Filed: Aug. 25, 1975

[51] Int. Cl.² .............................................. G02B 5/14
[52] U.S. Cl. .................... 350/96 WG; 350/96 C
[58] Field of Search ................... 350/96 WG, 96 C

[56] References Cited

U.S. PATENT DOCUMENTS

| | | | |
|---|---|---|---|
| 3,589,794 | 6/1971 | Marcatili | 350/96 WG |
| 3,883,220 | 5/1975 | Taylor | 350/96 WG |
| 3,909,108 | 9/1975 | Taylor | 350/96 WG |
| 3,920,314 | 11/1975 | Yajima | 350/96 WG |

OTHER PUBLICATIONS

Taylor, "Optical-Waveguide Connecting Networks", Electronics Letters, vol. 10, No. 4, pp. 41–43, Feb. 1974.

*Primary Examiner*—John K. Corbin
*Assistant Examiner*—Stewart Levy
*Attorney, Agent, or Firm*—R. S. Sciascia; G. J. Rubens; J. W. McLaren

[57] ABSTRACT

An optical waveguide arrangement operates in the manner of an interferometer to provide modulator and/or switching functions. Two optical waveguide branches having a common connection diverge along a substantially coextensive distance and reconverge to provide first and second light paths of identical optical length. Conductive electrodes are disposed contiguous to at least one of the optical waveguide branches and are connectable through a controlling switch to a source of electrical energy for producing an electric field across the energized electrodes. In the absence of such electric field, light energy entering the two optical waveguide branches will propagate along identical optical path lengths and recombine constructively at the reconvergence of the waveguide branches. However, a selectively applied electrical energy changes the optical property of at least one of the optical waveguide branches causing phase differences in the optical energy transmitted by the branches and producing destructive interference at the reconvergence of the optical waveguide branches. The addition of two optical waveguide sections having different dimensions provides a switch function when one of such additional waveguides is dimensioned to be conducive to the propagation of first order mode light energy while the other waveguide is dimensioned to be conducive to the propagation of second order mode light energy.

8 Claims, 10 Drawing Figures

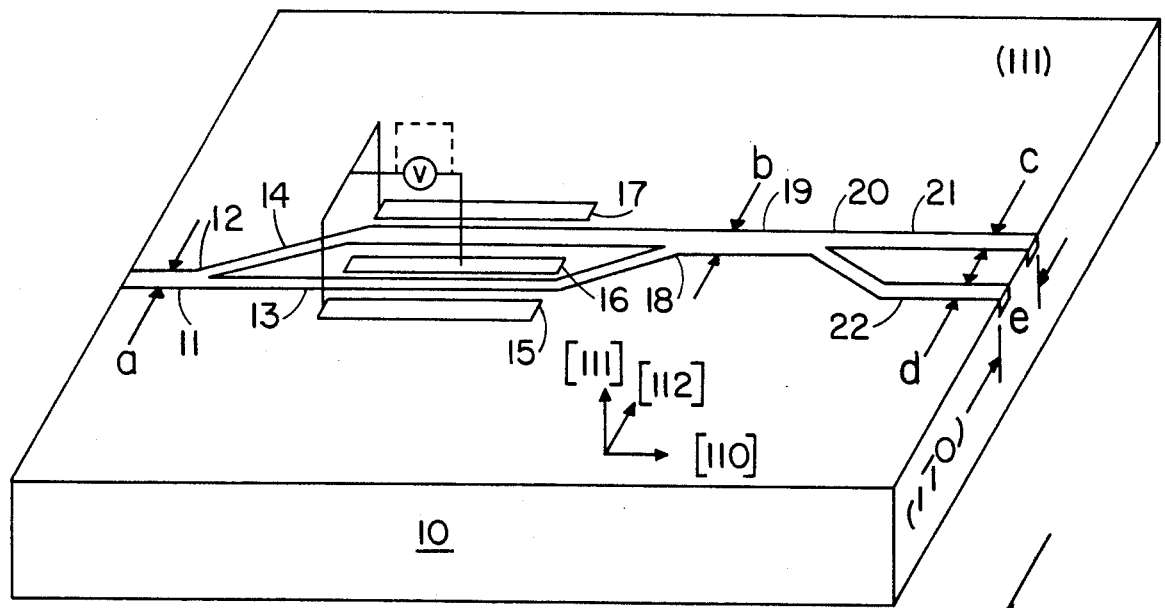
FIG. 1a
FIG 1b
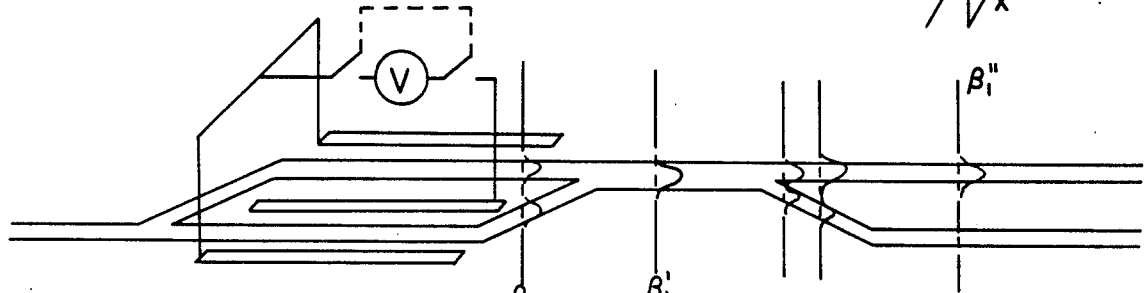
$V=0, \Delta n=0$
FIG. 2a
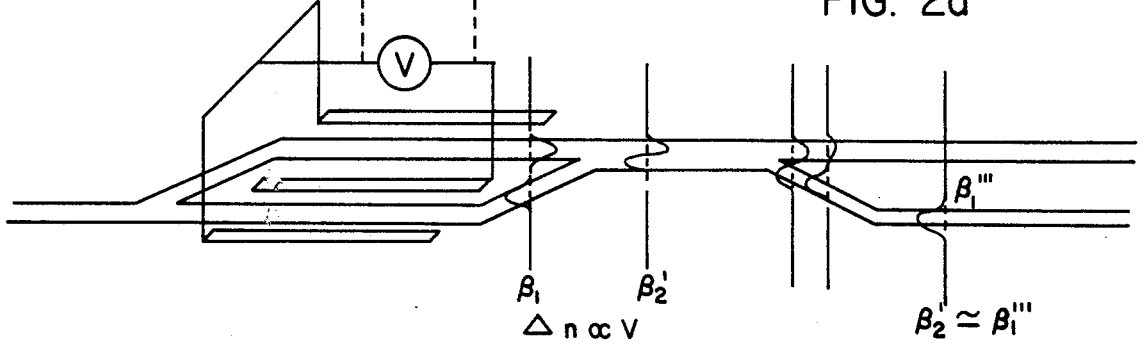
$\Delta n \propto V$
$\beta_2' \simeq \beta_1''''$
$$\pi = \frac{2\pi}{\lambda} \Delta n \, L$$
FIG. 2b

OPTICAL WAVEGUIDE INTERFEROMETER MODULATOR-SWITCH

BACKGROUND OF THE INVENTION

Many of the prior art methods and combinations of apparatus which are designed to accomplish optical waveguide amplitude modulation have intrinsically and inherently involved the reliance upon additional polarizer/analyzer devices for their operation. Generally, it may be said that many of such prior art methods and arrangements have relied upon giving effect to a polarization of light energy change which is induced in transmitted light in an optical waveguide or a bulk crystal device by either acousto-optic, magneto-optic, or electro-optic effects.

For example, optical waveguide switching and modulation has been proposed in the prior art as exemplified by U.S. Pat. No. 3,589,794 issued in the name of Enrique A. J. Marcatili on June 29, 1971. The optical waveguide amplitude modulation and switching functions achieved in this patent and many related prior art concepts was realized by the modification of resonant optical coupling between two parallel or closely contiguous optical waveguides.

Despite the fact that analogous coupled devices have been well known to operate satisfactorily in microwave technology applications, coupled optical waveguides depending upon resonance conditions inherently involve dimensional tolerances which are extremely critical for an efficient and effective operation at most optical wavelengths.

Although resonant coupling optical waveguide switching and modulation is relatively quite simple in concept, it's implementation is extremely difficult to realize through fabrication by practical and convenient techniques due to the extremely stringent tolerances required for it to function as a wholly effective device.

Accordingly, it is highly desirable that an optical waveguide interferometer modulator/switch be devised which inherently does not require the severely critical dimensional tolerances of prior art concepts and arrangements designed to be functionally equivalent in performing optical modulation and switching operations.

SUMMARY OF THE INVENTION

The present invention is based on the concept of giving effect to constructive and destructive optical interference of light energy through the means of mode shifting in waveguides which are fabricated in optically active material. Such optically active material may comprise acousto-optic, magneto-optic or electro-optic responsive materials, though the latter has been found to be much the best in performance and ease of controlling the desired effects. Though the concept of the present invention inherently involves the use of optically active materials which are controlled in a particular manner in optical waveguides or particular requisite configurations, there is some analogy of the interferometric phenomena involved to certain well known classical optical interferometers such as the Mach-Zehnder interferometer.

In accordance with the concept of the present invention the optical waveguide interferometer modulator switch may comprise an optical waveguide for transmitting single mode optical energy originating at the suitable source. First and second single mode optical waveguide branches as defined by electro optically responsive material converge at a common connection to the optical waveguide transmitting the single mode optical energy. The first and second single mode optical waveguide branches diverge along a substantially coextensive distance to reconverge for providing first and second single mode light paths of identical optical length. As is well known and will be appreciated by those thoroughly skilled and knowledgeable in the pertinent optical arts, identical optical length may or may not coincide with identical physical dimensional length and in accordance with the concept of the present invention the optical length of one of the single mode optical waveguide branches may be modified to bring about the identical optical length as desired between the two single mode optical waveguide branches.

A light path is connected with the first and second single mode optical waveguide branches at their reconvergence and appropriate control means are arranged relative to the first and second single mode optical waveguide branches for modifying their optical properties. Such control means may comprise acoustic transducers, magneto transducers, or conductive electrodes depending upon whether the optically active material of the first and second single mode optical waveguide branches is acousto optically responsive, magneto optically responsive, or electro optically responsive, respectively.

In a preferred embodiment of the present invention it has been found that electro optically responsive material employed to define the first and second single mode optical waveguide branches is readily controllable to the degree of response necessary to provide most desirable results in its operation. Accordingly, conductive electrodes are disposed contiguous to at least one of the optical waveguide branches defined by electro optically responsive material and a source of suitable electrical energy is arranged to be connected through controlling switch means to selectively change the optical properties of at least one of the optical waveguide branches by impressing an electrical field thereacross. Such electric field causes phase differences in the optical energy transmitted by the two single mode light paths of identical optical length and produces consequent destructive optical interference at the reconvergence of the first and second optical waveguide branches into a single mode waveguide.

Where the amplitude of the electrical energy which is selectively connected to the electrodes is sufficient to cause $\pi$ radians phase difference in the optical energy transmitted by the first and second single mode optical waveguide branches, the destructive interference is virtually complete, causing maximum depth of modulation at the single mode waveguide reconvergence of the two single mode optical waveguide branches.

On the other hand, when the reconvergence of the first and second single mode optical waveguide branches is connected to a multi-mode optical path, waveguide, i.e., two modes can be supported, multi-mode optical energy will be transmitted along such path having components of first order mode light energy and second order mode light energy, as well.

The optical waveguide interferometer modulator as previously described can be rendered operative as a switch by the addition of two diverging optical waveguides connected to the multimode optical path in which the two diverging optical waveguides have different dimensions such that one of the diverging optical waveguides has a propagation velocity characteristic which is selectively conducive to the transmission of first order mode light energy, while the other of the diverging optical waveguides has a propagation velocity which is selectively conducive to the transmission of second order mode light energy received from the multi mode optical path.

As a result light energy will be propagated along one or the other of the two diverging optical waveguides in accordance with the instantaneous condition of whether or not electrical energy has been applied to the electrodes contiguous to the first and second single mode optical waveguide branches which is determinative of whether first order or second order light energy is developed at the reconvergence of the first and second single mode optical waveguide branches. Thus, the application or lack of application of electrical energy to the previously described electrodes will determine which of the two diverging optical waveguides will transmit light energy and effectively provide a switch for optical energy.

As will be appreciated readily by those knowledgeable and skilled in the pertinent optical arts, the identical optical length of the two single mode optical waveguide branches can be achieved by the application and maintenance of a suitable dc bias potential to correct for slight dimensional differences in the physical configuration of the two single mode optical waveguide branches.

Further, in accordance with the concept and teaching of the present invention, either a dc or an ac potential may be employed to provide the requisite electro optical effect in changing the phase of the light energy propagating along one or both of the two single mode optical waveguide branches of identical optical length to cause optical interference and produce the desired ultimate results at the reconvergence of the two single mode optical waveguide branches.

Accordingly, it is a primary object of the present invention to provide an optical modulator-switch employing optical interferometer principles.

Another most important object of the present invention is to provide such an optical waveguide modulator switch which employs optical interferometric principles to perform mode converter functions.

A further important object of the present invention is to provide such an optical waveguide modulator in which the modulating-switching function is performed by asymmetric divergent optical waveguides operating as mode selectors.

Another most important object of the present invention is to provide an optical waveguide modulator-switch inherently having significantly less stringent dimensional tolerance requirements as compared to functionally equivalent optical modulator switches known in the prior art.

A concomitant object of the present invention is to provide an optical waveguide switch which is adaptable to control the amount of light switched as a function of a controllable applied electrical potential as may be desired in picking off a small fraction of light energy from an optical data bus line, for example.

A further object of the present invention is to provide such an optical switch which may be operated in reverse to function as a controllable light insertion unit.

And an overall prevading objective of the present invention is to provide an optical waveguide modulator switch which can be fabricated to reasonably attainable dimensional tolerances from readily available materials by known techniques affording a broad variety of suitable combinations of materials and techniques.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIGS. 1a and 1b are greatly enlarged illustrations of an embodiment of the present invention;

FIGS. 2a and 2b are schematic graphical illustrations of the operative conditions prevailing in two different states of an embodiment of the present invention such as that shown in FIGS. 1a and 1b;

DESCRIPTION OF THE PREFERRED EMBODIMENTS

Figure 3:
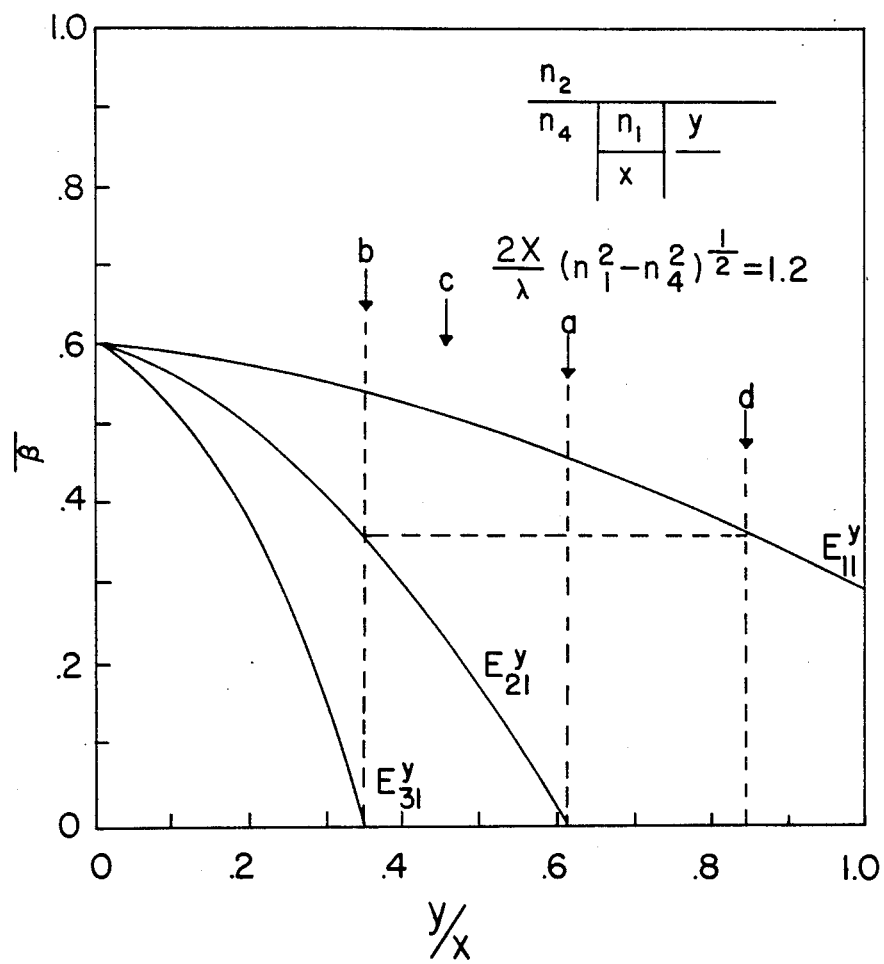
FIG. 3 is an illustration of the propagation constants calculated for a channel optical waveguide of a type which may be employed in the present invention.

FIG. 1a illustrates an embodiment of the present invention in which a single crystal ZnSe may be employed together with diffusion techniques which are known to the art and as has previously been disclosed and discussed in a publication by the inventor herein which appeared in the *Journal of Applied Physics,* Volume 44, at page 3703.

Sputtered silicon dioxide may be employed as a diffusion mask with conventional photolithographic techniques using commercially available photo resist to define the optical waveguide pattern of the device. Cadmium diffusion into the etched pattern in the silicon dioxide mask produces controllable refractive index increases in the ZnSe substrate 10. The optical waveguides produced by diffusion are not precisely rectangular in cross-section as illustrated in the drawing of FIG. 1a but contain some refractive index gradients as has been pointed out by the inventor herein in a disclosure which appeared in Volume 13 of *Applied Optics,* page 2112. However, waveguide calculations made for diffused channel waveguides indicate that the mode structure is not significantly different from calculations made assuming a rectangular cross-section channel waveguide so that very close approximations are valid.

In FIG. 1a an embodiment of the present invention is illustrated in which an incoming single mode optical waveguide 11 diverges at 12 into two single mode optical waveguides 13 and 14. The single mode optical waveguide branches 13 and 14 diverge along a substantially coextensive distance to reconverge for providing first and second single mode light paths of identical optical length.

Conductive electrodes 15 and 17 are disposed substantially parallel to, and outside, the first and second optical waveguide branches 13 and 14, respectively. A third electrode 16 is disposed between the two optical waveguide branches 13 and 14.

In the particular embodiment illustrated in FIG. 1a, at the reconvergence 18 of the first and second single mode optical waveguide branches 13 and 14, a multi mode waveguide 19 is formed. The multi mode optical waveguide 19 diverges at 20 into two optical waveguides 21 and 22 having different dimensions.

In operation of the embodiment illustrated in FIG. 1, when no potential is applied to the electrodes 15, 16, and 17, light in the single mode waveguide 11 propagates with a mode velocity $\beta_1$ and is divided equally at 12 into the two optical waveguide branches 13 and 14. When the light energy thus propagated reaches the point 18, it has travelled the same distance in each optical waveguide branch since they are substantially of identical optical length and therefore the reconverging light is in phase and combines constructively, producing the lowest order mode which propagates with velocity $\beta_1'$ in the optical waveguide section 19.

The light energy propagates in the optical waveguide section 19 to the point 20 where it will continue to propagate in either the optical waveguide section 21 or the optical waveguide section 22 depending on which of the mode propagation constants in the two optical waveguide sections 21 or 22 most closely matches the propagation and velocity constant $\beta_1'$.

However, when an electrical potential V is applied to electrodes 15, 16, and 17 through a suitable ganged switch means schematically represented in an open condition in FIG. 1a, and in closed condition in FIGS. 2a and 2b such that the polarity of electrode 16 is opposite the polarity of electrodes 15 and 17, a change is caused in the optical properties of the optical waveguide branches 13 and 14 depending upon the electro optical responses of the type of material employed, its orientation, and the magnitude of the applied electric field as well.

In typical operation, the applied electrical potential V will produce an electric field E between electrodes 15 and 16 which is opposite in sense to the electric field developed between electrodes 16 and 17. In the optical waveguide branch 13 the applied electric field produces a small change of refractive index for TE (polarized parallel to the plane of the device) modes which may be expressed as $$\Delta n_{TE} = \frac{n^3}{2} E \delta_{TE} \quad (1)$$

$$\Delta n_{TM} = \frac{n^3}{2} E \delta_{TM} \quad (2)$$

where $\delta_{TE}$ and $\delta_{TM}$ are found from the specific type and orientation of the crystal. In general $\delta_{TE} \neq \delta_{TM}$ except in certain orientations.

For simplicity and clarification of explanation it may be assumed that $\delta_{TE} = \delta_{TE} = \delta$. The phase shift induced in the light by this small change of refractive index may be expressed as $$\Delta \phi = \frac{2\pi}{\lambda} \frac{n^3}{2} E l \delta \quad (3)$$

where $\lambda$ is the wavelength of the light and $l$ is the length of the waveguide over which the electric field is applied.

In the optical waveguide branches 13 and 14 the phase shift is equal but opposite in sense so that the phase difference between light propagated along the two optical waveguide branches 13 and 14 is $$\Delta \phi = \frac{2\pi}{\lambda} n^3 E l \delta. \quad (4)$$

Those skilled and knowledgeable in the pertinent arts will appreciate that the concept of the present invention does not require that equal and opposite electric fields be applied to the two optical waveguide branches 13 and 14 to produce the desired phase difference but approximately twice the electric potential could be applied to the pair of electrodes 15 and 16 or the other pair 16 and 17 to produce substantially the same phase difference as is given effect by generating equal and opposite electric fields. However, it will be equally well appreciated that in practice it is generally desirable to employ minimum operational electric potentials; thus, the equal and opposite electric field technique is generally preferred.

If the applied electrical potential is such that $\Delta\phi = \pi$ the light in optical waveguide branches 13 and 14 will be out of phase and thus destructively interfere. Stated in a different way, the application of an appropriate electrical potential causes the light propagating in the optical section 19 to shift from the lower order mode with propagation constant $\beta_1'$ to the second order mode (which has a null at its center) with propagation constant $\beta_2'$.

FIGS. 2a and 2b illustrate the mode profiles as a function of distance along the optical paths of the embodiment of FIG. 1a when it is operated as a switch. Such operation results from the choice of dimensions of the optical waveguide section 21 and 22 to be such that the propagation constant, $\beta_1'$, of the lowest mode in optical waveguide section 21 matches the lowest mode in optical waveguide portion 19, i.e., $\beta_1' = \beta_1''$.

The propagation constant of the lowest mode $\beta_1''''$ of waveguide 22 is chosen to be the same as the second mode of the waveguide section 19, i.e., $\beta_2' = \beta_1'''$.

It should be noted that the embodiment of the present invention illustrated in FIG. 1 may be operated as an amplitude modulator. In such operation the waveguide sections 21 and 22 are not required, and the optical waveguide portion 19 need not only be single mode in character.

As indicated schematically in FIGS. 2a and 2b, the application of a voltage to the electrodes of the embodiment of the present invention illustrated in FIG. 1a causes variation in the effective optical length of the two optical waveguide branches so that interferometer type performance is realized by utilization of the electro optic properties of the optical waveguide material. Accordingly, the optical waveguide interferometer modulator-switch of the present invention may be considered to be a mode converter, ideally with substantially equal optical length of the two optical waveguide branches 13 and 14 of FIG. 1a, the light propagating along the two optical guide branches being recombined as shown in FIG. 2a to produce the lowest order mode. However, upon the application of an electric field so as to cause a phase shift or $\pi$radians between the two optical waveguide branches 13 and 14, the recombination of the propagated light results in a light field distribution having a value of zero at the center of the recombined light energy, i.e., the second order mode as shown in FIG. 2b. Accordingly, the present invention will operate as an amplitude modulator requiring no external polarizers with the only requirement being that the exit optical waveguide where the propagated light is recombined be of single mode character and far from the second mode cut-off. Applying the electric field therefore causes the light in the exit optical waveguide to be extinguished since the mode produced is not confined.

For the present invention to operate in the manner of a switch requires that the exit optical waveguide be multi mode in character and also the addition of optical waveguide portions of different dimensions as previously described.

FIG. 3 illustrates propagation constant calculations for a channel optical waveguide with fixed depth and varying width. The ratio $y/x$ is that of the depth of the waveguide to the width of the waveguide as shown by the enlarged illustration of FIG. 1b.

Three modes are plotted in FIG. 3 with the desired operating widths "a", "b", "c", and "d" referring to FIG. 1a. The width indicated as "a" in FIG. 1a ensures single mode operation of the interferometer section. The exit optical waveguide portion with an operating width 'b' propagates two modes only.

The width "c" is chosen such that the lowest mode of "b" has nearly the same propagation constant as the lowest mode in "c" and is as far as possible from the second mode "b". The width "d" is chosen to match the propagation constant of the second order mode of "b".

It has been found that in fabricating operative embodiments of the present invention there is considerable latitude in choosing the various optical waveguide widths and that, moreover, the individual width tolerances are not extremely stringent to produce satisfactory operative results.

Waveguide mode calculations on diffused channel waveguides indicate a mode structure that is not significantly different from the calculations for rectangular channel waveguides illustrated graphically in FIG. 3 if the dimensions and normalizations are well chosen. In the implementation of the present invention, it has been found that for a branching angle of 1° the power divides equally into branches of the same dimensions within 0.1 db if the waveguides contain less than 3 modes.

In FIG. 1 the branching angles of the illustrated embodiment were chosen unsymmetrically with respect to the center line of the structure which is an indication of the large tolerances that are acceptable for satisfactory operation employing the teaching of the present invention.

The operation of the interferometer concept of the present invention involves several important considerations. The crystal orientation of the ZnSe substrates, for example, is not a usual one even for bulk crystal electro optic modulators. The crystal orientation was chosen to maximize the useable substrate area in a crystal which twins perpendicular to the [111] direction. The entrance and exit phases are (110) cleavage planes which give the devices an unusual orientation. The TE and TM phase shifts in a cubic bulk crystal having the described orientation may be expressed by the approximations $$\Delta_{TE} = \frac{-2\pi}{\lambda} \frac{n_o^3}{2} r_{41} E \frac{\left(4\sqrt{3}\right)}{9} \quad (5)$$

$$\Delta_{TM} = \frac{\pm 2\pi}{\lambda} \frac{n_o^3}{2} r_{41} E \frac{\left(\sqrt{3}\right)}{9} \quad (6)$$

With $l$ the device length, $r_{41}$ the electro-optic coefficient, and E the applied field. Thus, it may reasonably be expected that TE and TM modes would behave quite differently in the interferometer section.

Figure 4:
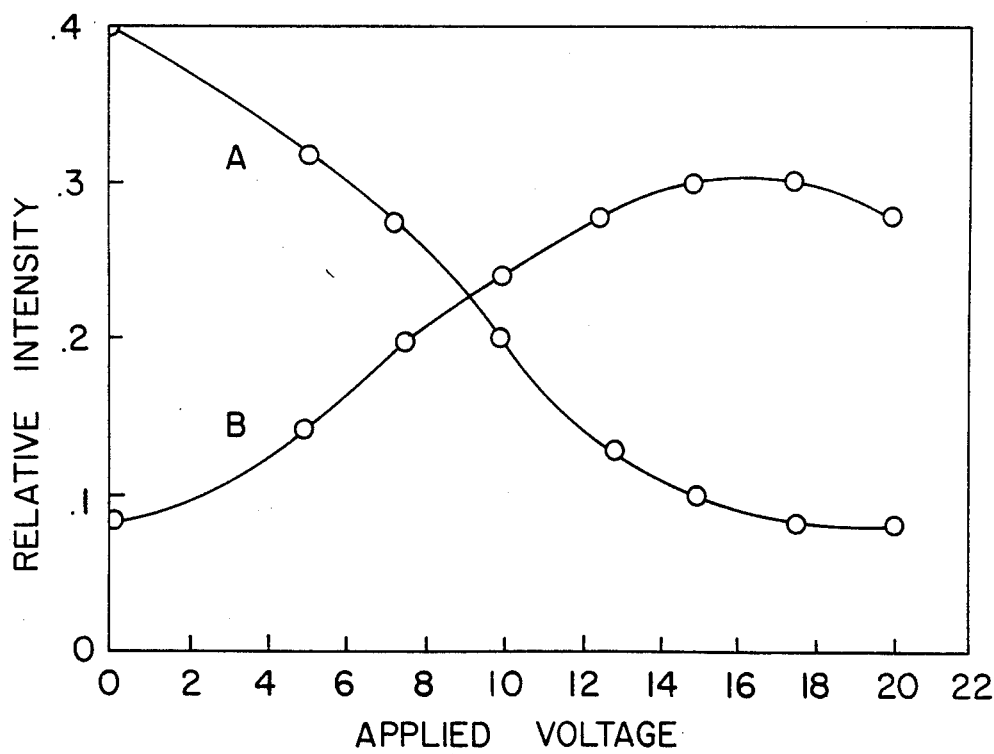
FIGS. 4 and 5 are illustrations of the propagating characteristics of two different embodiments of the present invention.
Figure 5:
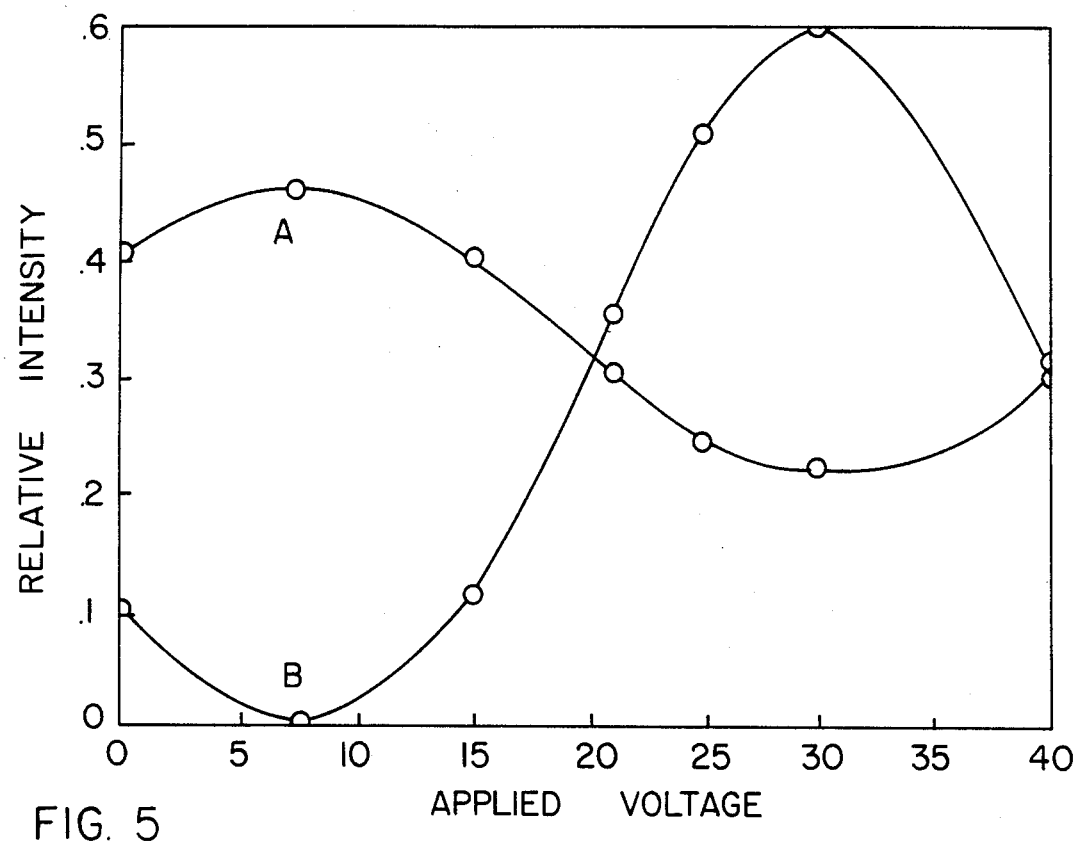

FIGS. 4 and 5 illustrate the operative characteristics of two different embodiments of the present invention propagating light of 0.63 μm wavelength. The operative characteristics illustrated in FIG. 4 indicate a slightly higher surface index than the operative characteristics of the embodiment illustrated in FIG. 5.

Operation of embodiments of the present invention does not appear to be strongly dependent upon the input light polarization if the interferometer section optical waveguides are far from the second mode cut-off. TE, TM, and elliptically polarized light were used with only small changes from the circularly polarized light performance characteristics illustrated in FIGS. 4 and 5. The changes were primarily in the overall output intensity and not in the magnitude of the switching operation.

If the interferometer section of an embodiment of the present invention is made to be multi mode in character, the TE modes are affected by a given applied electric field much more strongly than are the TM modes. This demonstrated behavior is in agreement with the expected results of a bulk crystal modulator having this orientation.

The waveguide dimensions of the embodiments whose characteristics are graphically presented in FIGS. 4 and 5 are not optimum terms of the parameters illustrated in FIG. 3 with the exception of single mode waveguides in the interferometer section. It is also reasonable to expect that with improved design experience, significant reductions in crosstalk can be realized.

The length of the interferometer region and the affect of mode propagation velocity changes induced by the electric field determine the required operating voltage. A [100] ZnSe crystal offers a factor of two reduction in the required voltage for a given length and will have equal TE and TM operating voltage, while an interferometer switch in other materials such as ZnTe or LiNbO₃ will offer corresponding reduction in either the length or operating voltage of the embodiment of the present invention.

The capacitance of the embodiment whose characteristics are represented in FIG. 4 is about 0.6pf, but may be reduced somewhat by implementation of optimum electrode configurations. Electronics limited rise times of 1nsc have been realized in both the modulator and switch embodiments of the present invention. Additionally, the modulator and the switch embodiments of the present invention have both demonstrated suitability for use in a 1GHz optical communication system, confirming their ready adaptability to high speed optical systems.

One of the principal advantages of the modulator-switch of the present invention is that it has reasonable dimensional tolerances which can readily be met by fabrication techniques which are presently well known. By contrast, directional coupler types of devices having comparable operational objectives are severely limited in the realization of their full capabilities because of extremely stringent dimensional tolerances which are most difficult to meet in the manufacture of practical devices by known presently available fabrication techniques.

Moreover, if small dimensional differences occur, such as a difference in the length of the two optical waveguide branches which cooperate to perform in the manner of an interferometer, the lack of precisely identical optical length may be corrected with a small dc static electrical potential bias applied to the electrodes of the modulator switch as is exemplified by the graphical illustration of FIG. 5, for example.

Due to the relative simplicity of the basic concept of the present invention, there are numerous alternatives and variant configurations in which it may be embodied. The two most basic configurations are (1) the interferometer with the single mode output optical waveguide for use as a modulator, and (2) the interferometer with a multiple mode output optical waveguide and mode selective branching optical waveguides for use as a switch. FIG. 1a, for example, illustrates the basic one input-two output optical switch.

Figure 6A:
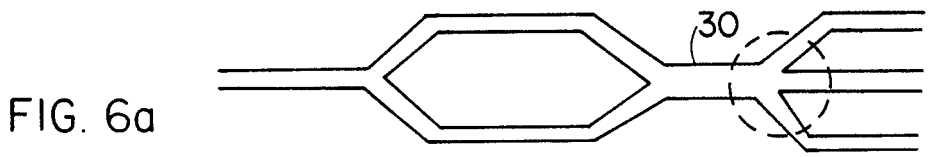
FIGS. 6a, 6b, and 6c are illustrations of several spatial arrangements employing multiple embodiments of the present invention.
Figure 6B:
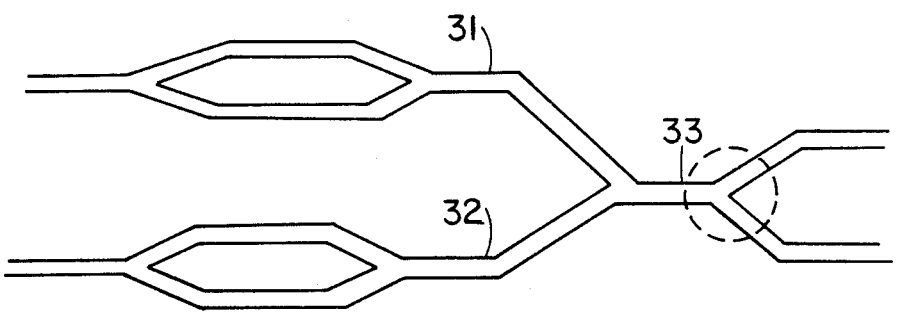
Figure 6C:
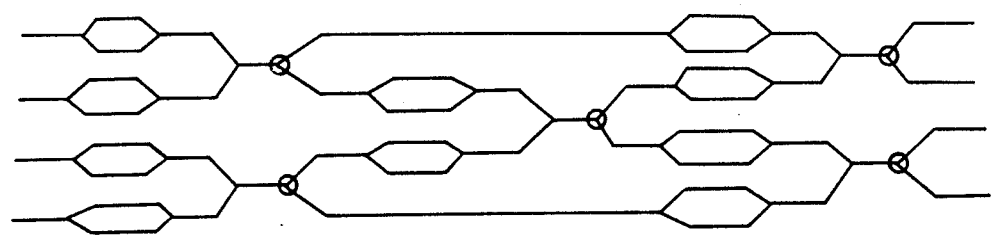

FIGS. 6a, 6b, and 6c illustrate several multi pole type switch embodiments of the present invention. In FIG. 6a the optical waveguide section 30 propagates three modes and thus is operationally functional as a 1×3 optical switch. FIG. 6a illustrates a 2×2 switch configuration with the optical waveguides 31 and 32 and 33 propagating two modes. FIG. 6c illustrates a 4×4 switch configuration employing two 2×2 switching elements. In this latter configuration of FIG. 6c, any one of four inputs can be switched to any one of four outputs.

Those skilled and knowledgeable in the pertinent arts will understand from the teaching of the present invention that many desired extension of its concepts may be realized to provide a N×N switching network of any number of inputs and outputs which may be desired.

Additionally, since the amount of light energy which is switched in the embodiment illustrated in FIG. 1a varies with the amplitude of the applied electrical potential, it may be used in a partial switching mode to pick off a specified fraction of light such as 10%, for instance, from an optical data bus line. Moreover, by operating the switch in reverse (that is to say, that the light would enter from the right in FIG. 1a) the device can be made to perform in the manner of a controllable light insertion unit.

Further, by choosing appropriate crystal materials, the phase shifts are defined in equations (1) and (2) can be made non-identical. This type of operation would then result in a polarization selective modulator or switch which may be used as a low loss polarizing element.

Also since both the induced phase shifts and the mode propagation characteristics are wavelength dependent, a switching device which is wavelength (i.e., color selective) is inherently possible within the concept and teaching of the present invention.

The embodiments of the present invention may be fabricated in both channel waveguides such as illustrated in FIG. 1a, or in epitaxial configuration where the plane of FIG. 1a would represent a cross-section through the device which would have no lateral confinement.

Materials suitable to fabricating embodiments of the present invention by known techniques include diffusion in II-VI compound, epitaxy and chemical etching in III-V compounds, and diffusion in ferro electric crystals, though the concept and teaching of the present invention is not limited to the use of these materials or techniques but may be extended to other suitable materials and techniques which are particularly adaptable to the requisites of specific applications of the invention.

Obviously many modifications and variations of the present invention are possible in the light of the above teachings. It is therefore to be understood that within the scope of the appended claims the invention may be practiced otherwise than as specifically described.

What is claimed is:

1. An optical waveguide interferometer modulator comprising:
   an optical waveguide for transmitting single mode optical energy;
   first and second single mode optical waveguide branches defined by electro-optically responsive material converging at a common connection to said optical waveguide, and diverging along a substantially co-extensive distance to reconverge for providing first and second single mode light paths of substantially identical optical length;
   a light path connecting with said first and second single mode optical waveguide branches at their reconvergence;
   conductive electrodes disposed contiguous to a portion of at least one of said single mode optical waveguide branches between its points of divergence and reconvergence;
   a source of electrical energy; and
   switch means controlling connection of said electrodes with said source of electricl energy to selectively change the optical properties of at least one of said single mode optical waveguide branches by impressing an electric field thereacross causing relative phase shift between the optical energy transmitted through said branches, and producing destructive optical interference in said light path at the reconvergence of said first and second single mode optical waveguide branches.

2. An optical waveguide interferometer modulator as claimed in claim 1 including first, second, and third electrodes connected to said source of electrical energy for producing electric fields of opposite polarity across said first and second single mode optical waveguide branches.

3. An optical waveguide interferometer modulator as claimed in claim 2 wherein said first and second electrodes are disposed outside and parallel to said first and second single mode optical waveguide branches, respectively, and said third electrode is disposed between said first and second single mode optical waveguide branches.

4. An optical waveguide interferometer modulator as claimed in claim 1 wherein said source of electrical energy is a d.c. potential.

5. An optical waveguide interferometer modulator as claimed in claim 1 wherein said source of electrical energy is an a.c. potential.

6. An optical waveguide interferometer modulator as claimed in claim 1 wherein said source of electrical energy is an a.c. potential and includes a variable d.c. bias potential.

7. An optical waveguide interferometer modulator as climed in claim 1 wherein the amplitude of the electrical energy connected to said electrodes causes $\pi$ radians phase difference in the optical energy transmitted by said first and second single mode optical waveguide branches.

8. An optical waveguide interferometer modulator as claimed in claim 1 operative as a switch in which said ligth path comprises a multimode optical waveguide connected to two diverging optical waveguides of different dimensions such that one of said diverging optical waveguides has a propagation velocity selectively conductive to the transmission of first order mode light energy received from said multimode optical waveguide, and the other said diverging optical waveguide has a propagation velocity selectively conductive to the transmission of second order mode light energy received from said multimode optical waveguide.

* * * * *